A. J. CLAYTON.
SANDWICH MACHINE.
APPLICATION FILED APR. 26, 1916.

1,211,375.

Patented Jan. 2, 1917.
3 SHEETS—SHEET 1.

WITNESSES

INVENTOR

A. J. CLAYTON.
SANDWICH MACHINE.
APPLICATION FILED APR. 26, 1916.

1,211,375.

Patented Jan. 2, 1917.
3 SHEETS—SHEET 2.

WITNESSES
R A Balderson
Jesse B. Heller

INVENTOR
A. J. Clayton

A. J. CLAYTON.
SANDWICH MACHINE.
APPLICATION FILED APR. 26, 1916.

1,211,375.

Patented Jan. 2, 1917.
3 SHEETS—SHEET 3.

WITNESSES
R A Balderson
Jesse B. Heller

INVENTOR
A. J. Clayton

UNITED STATES PATENT OFFICE.

ALFRED J. CLAYTON, OF BROOKLYN, NEW YORK, ASSIGNOR TO N. Y. SANITARY FOOD CORP., OF NEW YORK, N. Y., A CORPORATION OF NEW YORK.

SANDWICH-MACHINE.

1,211,375.  Specification of Letters Patent.  Patented Jan. 2, 1917.

Application filed April 26, 1916. Serial No. 93,700.

*To all whom it may concern:*

Be it known that I, ALFRED J. CLAYTON, a citizen of the United States, residing at Brooklyn, in the county of Kings and State of New York, have invented a new and useful Improvement in Sandwich-Machines, of which the following is a full, clear, and exact description, reference being had to the accompanying drawings, forming part of this specification, in which—

Figure 1:
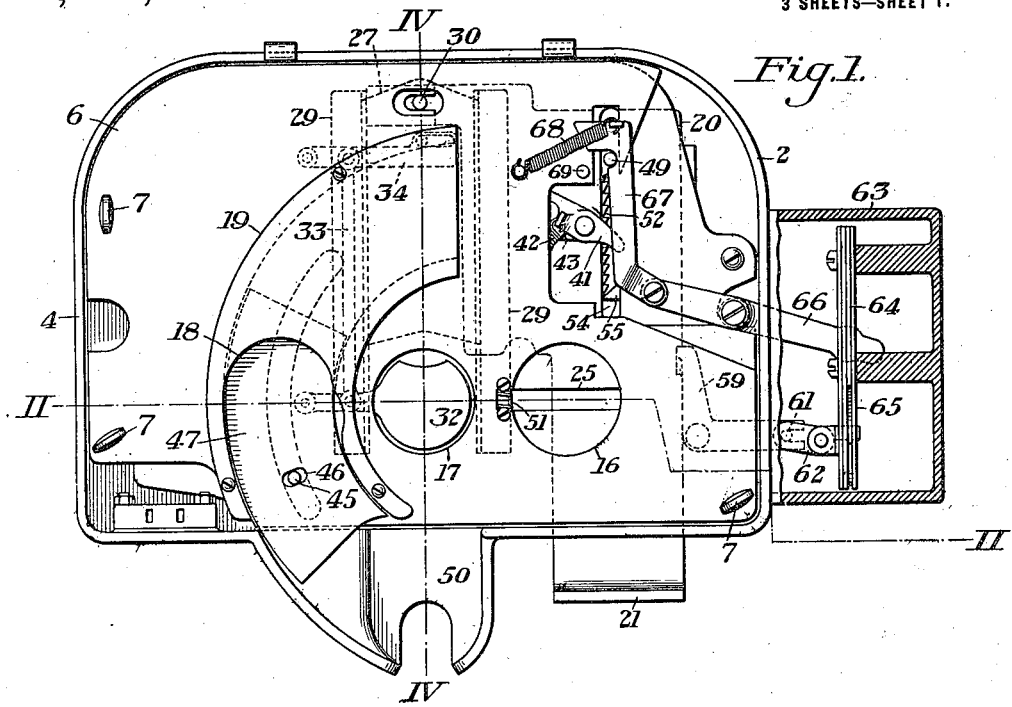
Figure 2:
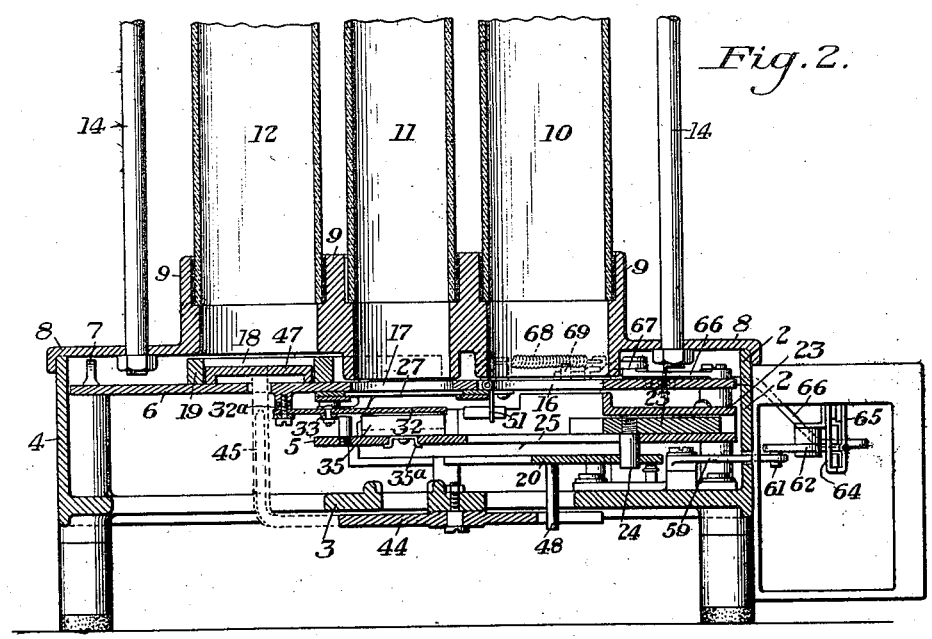
Figure 3:
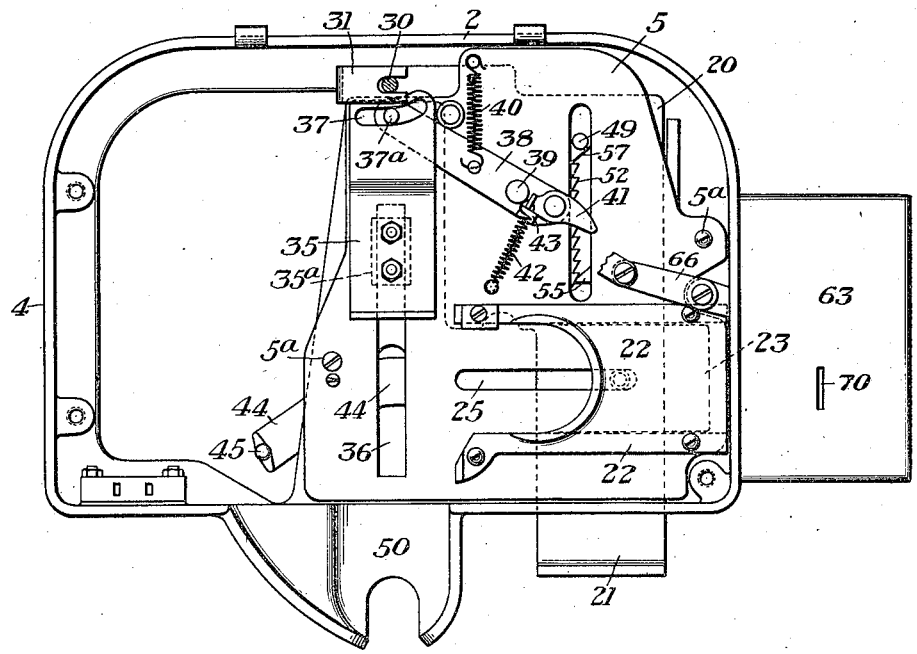
Figure 4:
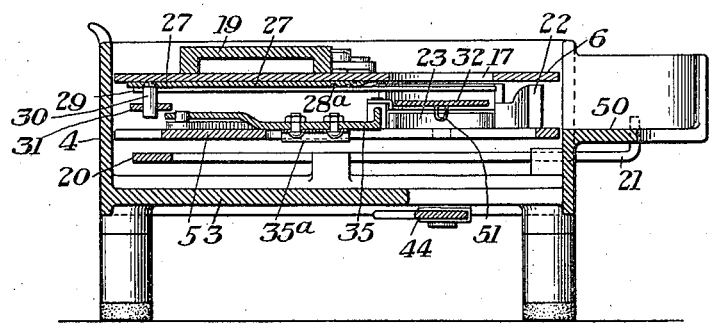
Figure 5:
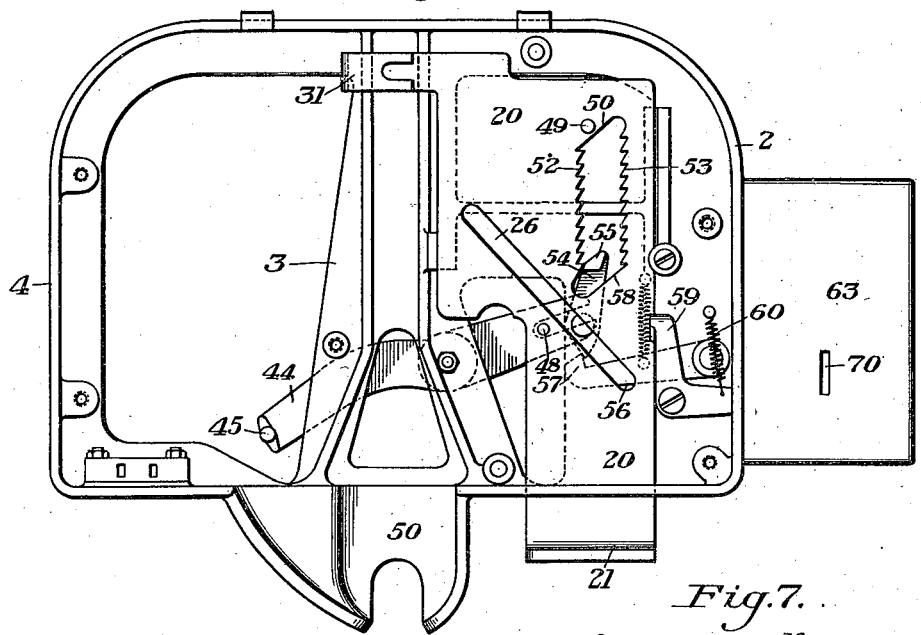
Figure 7:
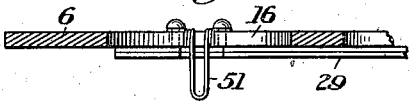
Figure 6:
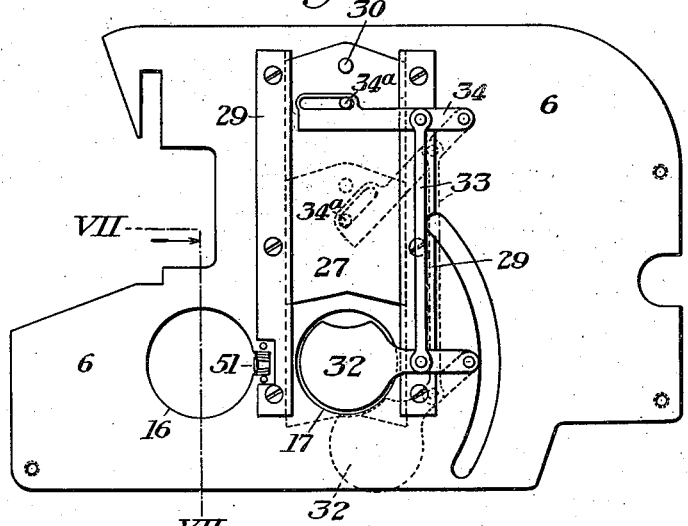

Figure 1 is a plan view of the casing containing the mechanism, with the lock-releasing mechanism casing in section. Fig. 2 is a transverse sectional view on the line II—II of Fig. 1 showing the casing for the lock-releasing mechanism in front elevation, with the door removed. Fig. 3 is a view similar to Fig. 1 with a portion of the mechanism removed. Fig. 4 is a sectional view on the line IV—IV of Fig. 1. Fig. 5 is a view similar to Figs. 1 and 3 with some of the portions of the mechanism removed, Fig. 6 is an inverted plan view of the top plate, together with the cutting engaging mechanism for the filling material, and Fig. 7 is a detail sectional view showing the yielding checking device.

This invention relates to a machine for making and dispensing sandwiches, and is designed to provide an efficient and sanitary machine which will make and deliver a single sandwich comprising one or more portions of investing material, and filling material, during each cycle of operation of the mechanism.

One of the objects of my invention is to provide a device of this character with an efficient feeding, gaging and slicing mechanism for the filling material and which is arranged to be adjusted to cut and deliver a slice of said material of predetermined thickness, the slicing knife therefor being shaped to prevent the filling material from sticking thereto.

A further object of my invention is to provide a yielding checking device at the exit of the holders for the investing material which will prevent the clogging of said exits and the jamming of the machine if crackers or other fragile articles are used as the investing material.

The form of mechanism illustrated in the drawings to which my improvements have been applied is designed for making a sandwich consisting of a slice of cheese between two crackers. It will be obvious that other cereal or bread products may be used as the supporting and investing material, and that the filler may be sliced from a mass of material other than cheese.

The machine is capable of superimposing two or more bodies, one of which has been previously severed from a larger mass and passing the aggregate to a point of delivery.

The present invention may be used for placing a portion of cheese on a cracker and then passing the same to a position of easy access. It may go still further and place a second cracker on the cheese to form a complete sandwich embodying the filler and two portions of investing material.

The precise nature of my invention will be best understood by reference to the accompanying drawings, which will now be described, it being premised, however, that various changes may be made in the details of construction and the general arrangement of the parts, without departing from the spirit and scope of my invention, as defined in the appended claims.

Referring to the accompanying drawings, the numeral 2 designates the frame or casing for the actuating mechanism, provided with a bottom 3 and sides 4 which inclose the parts. Connected to projections on this casing, by means of screws 5ª is a supporting plate 5, and 6 is a similar plate held in position within the casing by means of screws 7.

8 is the cover for the casing provided with an upwardly extending flange 9 in which are seated three tubular holders 10, 11 and 12. The outer holders 10 and 12 are adapted to contain the investing material from which the sandwiches are formed, while the center holder 11 contains the cheese or filling material. These holders are held in place on the cover 8 by means of a top plate not shown, which is held in position by means of through-bolts 14 extending through the plate and the cover 8. The holder 10 is immediately above an opening 16 in the plate 6; while the holder 11 is immediately above a similar opening 17 in the plate 6. The holder 12 extends upwardly from a recess 18 in a guide-plate 19 connected to the plate 6.

Slidably mounted in guides in the frame 2 is a draw bar 20, which is provided with a handle 21 which extends outwardly through an opening in the frame of the machine. This draw bar is arranged to actuate the various elements of the machine, as hereinafter described.

Slidably mounted in a guide-plate 22, connected to the plate 5, is an ejector 23, provided with a downwardly extending pin 24 which passes through a transverse slot 25 in the plate 5, and an angular slot 26 in the draw bar 20. This ejector is adapted to push the lower investing portion from the column in the holder 10 to a position under the opening 17 in the plate 6, through which the filling material passes.

27 is a knife for cutting the investing material from the bottom of the column of such material in the holder 11. This knife is arranged to reciprocate in guide members 29 secured to the bottom of the plate 6. It is provided, at the rear end, with a pin 30, which extends downwardly through a slot in an arm 31, which arm extends upwardly from the draw bar 20, so that the knife will be reciprocated directly through the medium of the draw bar.

Pivoted to the bottom of the plate 6 is a cheese supporting platform 32, which is adapted to be raised and lowered to vary the distance between the top thereof and the cutting edge of the knife, by removing or adding washers 32ª between the plate 6 and said platform at the pivotal point thereof.

33 is a link connected to the platform 32 and an operating lever 34 is pivoted to the plate 6.

34ª is a pin connected to the knife 27 and which is arranged to actuate the lever 34 to shift the platform 32 from under the cheese column, as shown in dotted lines in Fig. 6, as the knife is advanced to slice off a piece of cheese.

Slidably mounted on the plate 5 is a sandwich ejector 35 which is adapted to reciprocate immediately below the knife and is provided with a guide member 35ª which extends through a slot 36 in the plate 5. The rear end of this ejector 35 is provided with a slot 37 which is engaged by a pin 37ª on one end of a lever 38, and which is pivoted at 39 to the plate 5.

40 is a coil spring for normally retaining the lever 38 in the position shown in Fig. 3.

41 is a dog pivoted to the end of the lever 38, and 42 is a spring connected to one end thereof and arranged to hold the rear end thereof against the stop 43 on the lever 38. This spring 42 also assists the spring 40 to draw the lever to its rearward position.

Pivotally connected to the bottom of the machine is a lever 44, having at one end an upwardly extending pusher arm 45 which passes through an arc-shaped slot in the plate 6 and an opening 46 in a pusher 47. This pusher arm is adapted to oscillate in an arc-shaped guide in the plate 19, immediately under the holder 12, which contains the other portions of the investing material. The other end of this lever 44 is provided with a slot or forked end for the reception of a downwardly extending pin 48 on the draw bar 20.

The operation of the foregoing mechanism is as follows: The draw bar 20 is drawn forwardly, and during this forward movement, the ejector 23 will move toward the left and move a cracker from the bottom of the column contained in the holder 10 to the left, under the opening 17. This lateral movement of the ejector is caused by the angular slot 26 in the draw bar. During this forward movement of the draw bar, the knife 27 will cut a slice of cheese from the bottom of the column and at the same time move the platform 32 forwardly, the arrangement of the parts being such that the cracker will be placed in position under the opening 17 just before the slice of cheese is chipped from the column. This slice will then drop on the cracker. The forward movement of the draw bar 20 also moves the pusher 47 backward in the slot and permits the lowermost cracker of the column contained in the holder 12 to drop on to the plate 5 to be in position to be ejected. During this forward movement of the draw bar 20, a pin 49 which is connected to the draw bar and extends upwardly through a slot in the plate 5, engages the dog 41, rocks it about its pivotal pin, and passes beyond the same. The draw bar is then pushed inwardly, and during its return movement, the ejector 23 and the knife 27 will be moved to their initial positions. At the same time the lever 44 will be rocked in the reverse direction to move the pusher 47 forward and move the lowermost cracker from under the column toward a delivery plate 50. During this movement of the draw bar 20, the pin 49 will move toward the dog 41 until it engages the same; and as soon as the dog 41 is engaged, the lever 38 will be rocked to thereby actuate the pusher 35 and push the cracker, together with the cheese, on to the delivery plate 50. Immediately after the cracker with the cheese thereon has been pushed on to the delivery plate, the pusher 47 will be advanced sufficiently to move the second cracker engaged thereby and place it on the cheese. The pin 49 will pass the end of the dog 41 before it reaches the limit of its movement, so that the springs 40 and 42 will return the lever 38 and the pusher 44 to the position shown in Fig. 3.

As is well known to those familiar with the baking art, it is almost impossible to bake crackers of the character which will be used in connection with this device, of uniform shape, and I have discovered that very frequently the crackers will jam at the exits of the containers. If these crackers should become clogged at these exits, they would be crushed by the ejectors so that they would not be in fit condition to receive the cheese. In order to overcome the jamming, I have provided spring fingers 51 at the exits which are arranged to yield, to permit distorted crackers to pass out through the exits, but which will still be effective to retain the second crackers in position below the columns.

It is essential in devices of this character to provide mechanism to prevent retrograde movement of the various parts after the mechanism has been put into motion; and to compel the operator to move the draw bar 20 forwardly the full length of the stroke, and to then move it inwardly the full length of the stroke and at the same time lock it against retrograde movement. In order to lock the parts against such movement, I provide two sets of ratchet teeth at 52 and 53 on the draw bar 20. Pivoted to the bottom 3 of the frame is a pawl lever 54 having a double acting pawl 55 at the front end thereof. The rear end of the lever 54 is V-shaped, and is arranged to be engaged by a cam 57 carried by a spring pressed lever 56 pivoted to the bottom of the frame.

When the parts are in the position shown in Fig. 5, the pawl 55 will be held in engagement with the teeth 52, so that the push bar can be moved outwardly, but not inwardly. After the push bar has been moved the complete inward stroke, the pawl 55 will engage the cam surface 57 which will move the pawl end to the right, so that the other end of the lever 56 will pass the center of the said cam and will immediately force the pawl into engagement with the teeth 53 so that the push bar can be moved outwardly, but not pushed inwardly. When the push bar reaches the complete outward stroke, a cam surface 58 will engage the pawl 55 and move the same to the opposite side into engagement with the teeth 52.

In order to lock the mechanism in its normal position, or in the position shown in Fig. 5, I provide a locking lever 59 having a projection at one end, which is adapted to be held in a recess in the side of the draw bar 20 and which lever is normally held in its locking position by means of a spring 60. One end of the lever 59 is formed to engage a pin 61 on a lever 62, which is pivotally connected in a casing 63 secured to the side of the frame 2. The other end of the lever 62 passes through a slot in a slide plate 64, mounted in guides 65 in the casing 63, and is arranged to be engaged by a check which acts on one end of the lever 62 and rocks the same about its pivotal pin to move the end of the lever 59 out of the detent in the push bar. Pivotally connected to the frame 2 is a lever 66, one end of which extends through a slot in a slide plate 64; and pivotally connected to the other end thereof is a lever 67. This lever 67 is normally held toward the left by means of a coil spring 68. This lever 67 is provided with a detent which engages the pin 49 when the parts are in the position shown in the drawings. The operation of this locking mechanism is as follows: A coin is dropped through a slot 70 in the top of the casing and falls upon the slide plate 64. The draw bar 20 is then moved inwardly a short distance to permit the coin to drop into the coin plate in front of the end of the lever 62. The draw bar 20 is then moved outwardly; and as the pin 49 on said bar is in engagement with the lever 67, the latter, together with the lever 66, will be rocked. This actuates the slide and causes the coin to move the end of the lever 62, and thereby the lever 59, to disengage the same from the detent in the draw bar, and permit it to be moved its full stroke. After the lever 66 has been moved a predetermined distance, the coin will pass the end of the lever 62 and drop through an opening in the guide 65 into the casing 63. The levers 67 and 69 will be moved by the pin 49 until the end of the lever 67 engages a stop pin 69, which will permit the pin 49 to move out of the detent and complete its stroke. When the push bar is moved inwardly, the pin 49 will engage the end of the lever 67 and return the locking devices to their normal positions.

The cutting edge of the knife is slightly V-shaped, as shown in dotted lines, in Fig. 1, while its lower face is provided with a recess 28$^a$ immediately back of the bevel of the blade. This recess provides an air space which prevents the moist cheese, or any other moist filling material, from adhering to the bottom of the knife, and causes it to be freed therefrom.

In the drawings, I have shown and described a structure for delivering two crackers and a slice of cheese, but it will readily be understood by those familiar with the art that other material than cheese, such as meat, fruit compositions, etc., may be formed into a column, sliced by the knife and deposited on the lower investing portion. Other investing material than crackers may also be placed in the containers or holders 10 and 11.

My invention provides a sandwich making and dispensing machine which is highly sanitary, since the filling and investing material are kept inclosed until the formed sandwich is delivered. During each cycle of operation, the machine is acting upon the parts of one and the same sandwich only, thus keeping the balance of the material in the machine confined in the containers and preventing it from getting dry; only those portions of the material which are immediately used and dispensed being disturbed. The means for preventing retrograde movement after a cycle has been initiated, makes it impossible for several sandwich parts being partially delivered without being used, and insures the proper completion of each cycle of movement. The coin controlled lock when used, provides a single locking mechanism for all parts of the machine, so that no part can be operated to disturb or deliver any portion of the sandwich material except upon the insertion of the proper coin. This, with the single actuating member also insures each part of the mechanism being always in proper relation to the others to perform its part in the cycle.

The machine is of portable character; and is compact, requiring but little space for its installation and operation.

I claim:

1. The combination with a container for investing material, of a container for filling material, a pusher for shifting a piece of investing material from its container to a position below the filling material container, a knife for slicing the filling material, a resilient finger at the exit of the investment container for controlling the outward movement of the material therefrom, and an ejector for pushing the assembled inserting and filling material to a delivery plate on the exterior of the machine; substantially as described.

2. The combination with a container for investing material, of a container for filling material, a pusher for pushing a piece of investing material from its container to a position below the filler container, a knife for slicing a chip of the filler material from the filler in the container and for supporting the body of the filling material against further downward movement while the knife is under said material, and an ejector for ejecting the assembled sandwich parts to a point of delivery, substantially as described.

3. The combination with a container for investing material, of a container for filling material, a pusher for pushing the piece of investing material from its container to a position below the filler container, a movable support for the bottom of said filling material, means for moving said support, a knife above said support for slicing the filler in such container upon the investing material pushed below the filler container, said knife being arranged to support the filling material against downward movement while the knife is under the material and during the time that the support has been moved from thereunder, and an ejector for ejecting the assembled sandwich parts to a point of delivery, substantially as described.

4. In a sandwich machine, mechanism for positioning investing material below a column of filling material, a movable support for said column, a knife for removing the filling material so as to place it on said investing material, actuating devices connected to the knife and support to shift the support when the knife is moved, mechanism for delivering the sandwich so formed, an actuating device for operating all of said mechanisms in a prearranged order to form and deliver a single sandwich during each cycle, and means for locking all of said mechanisms at the completion of each cycle; substantially as described.

5. In a sandwich machine, mechanism for positioning investing material below a column of filling material, a movable support for said column, a knife for removing the filling material and placing it on said investing material, actuating devices connected to the knife and support to shift the support when the knife is moved, mechanism for delivering the sandwich so formed, an actuating device for operating all of said mechanisms in a prearranged order to form and deliver a single sandwich during each cycle, means for preventing retrograde movement of said mechanisms, and means for locking said mechanisms at the completion of each cycle; substantially as described.

6. In a sandwich machine, mechanism for positioning investing material below a column of filling material, a movable support for said column, a knife for removing the filling material and placing it on said investing material, actuating devices connected to the knife and support to shift the support when the knife is moved, mechanism for delivering the sandwich so formed, an actuating device for operating all of said mechanisms in a prearranged order to form and deliver a single sandwich during each cycle, means for locking said mechanisms at the completion of each cycle, and means for releasing said locking means to permit the mechanism to be actuated; substantially as described.

7. A sandwich making and dispensing machine, having a container for investing material and a container for filling material, a feeder for delivering a piece of investing material from its container, a movable support for the filling material, means for severing a portion of the filling material and assembling it with an investing material, and means for moving the support from under the column of filling material as the severing means is advanced across said column; substantially as described.

8. A sandwich making and dispensing machine having a container for investing material and a container for filling material, a feeder for delivering a piece of investing material from its container to a point below the container for the filling material, an adjustable support for the filling material, means for severing a portion of the filling material and assembling it with the investing material, means for shifting the support from under the column as the severing device moves across the column, an ejector for delivering said sandwich, and actuating connections arranged to actuate said means, said means acting upon the component parts of a single sandwich during a cycle of the movement; substantially as described.

9. A sandwich forming and dispensing machine, comprising containers for investing and filling material, a movable support for the filling material, a cutter for the filling material, support actuating means connected to the cutter, mechanisms which carry the sandwich parts into assembled relations, an ejecting mechanism, a single actuating member operatively connected to the said cutter and mechanisms, and a single lock for locking the cutter and mechanisms at the completion of each cycle of their operations, whereby said parts are at all times maintained in proper relative operating relations; substantially as described.

In testimony whereof, I have hereunto set my hand.

ALFRED J. CLAYTON.

Witnesses:
    FLORENCE A. CLAYTON,
    GEORGE M. ABBOT.